United States Patent [19]
Amundsen et al.

[11] Patent Number: 6,042,794
[45] Date of Patent: Mar. 28, 2000

[54] PROCESS FOR PRODUCING ANHYDROUS MGCL₂

[75] Inventors: Ketil Amundsen, Oslo; Hans Ragnar Eklund, Kolsås, both of Norway; Ralf Schmidt, Düsseldorf, Germany

[73] Assignee: Norsk Hydro ASA, Oslo, Norway

[21] Appl. No.: 09/214,927

[22] PCT Filed: Jun. 19, 1998

[86] PCT No.: PCT/NO98/00188

§ 371 Date: Jan. 15, 1999

§ 102(e) Date: Jan. 15, 1999

[87] PCT Pub. No.: WO98/58875

PCT Pub. Date: Dec. 30, 1998

[30] Foreign Application Priority Data

Jun. 20, 1997 [NO] Norway ..................... 972861

[51] Int. Cl.⁷ ................. C01F 1/00; C01F 5/32; C01B 25/32; B01D 11/00
[52] U.S. Cl. ............ 423/155; 423/157.3; 423/163; 423/169; 423/498; 423/658.5
[58] Field of Search ............... 423/155, 159.2, 423/158, 162, 163, 178, 463, 498, 157.3, 658.5, 175, 165, 356, 470, 497, 637, 169

[56] References Cited

U.S. PATENT DOCUMENTS

| | | | |
|---|---|---|---|
| 3,742,100 | 6/1973 | Boyum et al. | 264/14 |
| 3,966,888 | 6/1976 | Braithwaite et al. | 423/498 |
| 4,720,375 | 1/1988 | Ainscow et al. | 423/175 |
| 5,120,514 | 6/1992 | Tveten et al. | 423/155 |
| 5,514,359 | 5/1996 | Sivilotti et al. | 423/498 |

FOREIGN PATENT DOCUMENTS

WO9511859  5/1995  WIPO .

*Primary Examiner*—Steven P. Griffin
*Assistant Examiner*—Maribel Medina
*Attorney, Agent, or Firm*—Wenderoth, Lind & Ponack L.L.P.

[57] ABSTRACT

A process for producing anhydrous magnesium chloride comprising steps of selective calcination of Mg-containing minerals, selective leaching of magnesium, separation of insoluble impurities, precipitation of magnesium chloride hexammoniate and thermal decomposition of the magnesium chloride hexammoniate crystals into magnesium chloride and ammonia.

33 Claims, 3 Drawing Sheets

PROCESS FOR PRODUCING ANHYDROUS MGCL$_2$

This application is a 371 of PCT/NO98/00188 filed on Jun. 19, 1998.

The present invention concerns a process for the production of substantially anhydrous magnesium chloride (MgCl$_2$) suitable for production of magnesium metal in electrolytic cells, and more particularly a process for selective leaching of magnesium from calcined Mg-containing minerals/ores using waterfree solvents.

In order to run a magnesium electrolysis process in an efficient way it is necessary to ensure that the applied MgCl$_2$ feed is substantially anhydrous and free from impurities having a deteriorating effect on the electrolysis process and/or the resulting magnesium metal quality. Consequently, MgCl$_2$ originating from natural or "artificial" brines or ores has to be subjected to a brine purification process (U.S. Pat. No. 5,120,514) and subsequently a dehydration process, e.g. by evaporation and drying of the solution of MgCl$_2$ in water (brine) (U.S. Pat. No. 3,742,100) or by spray drying or granulation of brine in air and melt dehydration/chlorination by means of HCl gas (WO95/31401). It is also known that magnesium chloride hexammoniate (MgCl$_2$.6NH$_3$) is useful as an intermediate material for production of anhydrous MgCl$_2$ (U.S. Pat. No. 3,966,888).

Thus, WO95/11859 describes a process where MgCl$_2$ brines are complexed with an organic solvent, e.g. ethylene glycol, followed by removal of water by a distillation step and producing MgCl$_2$.6NH$_3$ by crystallization by adding NH$_3$ to the waterfree ethylene glycol solution.

A common feature of all these known processes is that they start from an aqueous MgCl$_2$ solution (brine) obtained by dissolving Mg-containing minerals/ores in hydrochloric acid (HCl in water) or from MgCl$_2$ hydrates or brines being a by-product from e.g. the potash industry, something which necessitates complex and energy demanding dehydration processes and furthermore extra purification steps to remove impurities and unwanted contaminants (e.g. Ca).

It is therefore a principal object of the present invention to provide a new and improved process for producing substantially anhydrous magnesium chloride avoiding the necessity for major dehydration steps in the process.

Another object of the invention is to provide a process based on use of a weak acid as a dissolving/leaching agent promoting a selective dissolution of MgO from the raw materials, thus avoiding the need for extensive purification steps in order to achieve a high purity anhydrous MgCl$_2$.

Still another object of the invention is to provide a low energy and a low capital investment demanding process for producing anhydrous MgCl$_2$.

These and other objects/features of the process according to the present invention are achieved by provision of a new process as it appears from the accompanying patent claims.

The invention thus concerns a process for producing substantially anhydrous magnesium chloride suitable for electrolytic production of magnesium metal comprising steps of a) selective calcination of Mg-containing minerals/ores or other Mg-containing materials at temperatures within a range of 350–900° C., b) selective leaching of magnesium from such calcined materials by using as a leaching solvent ammonium chloride dissolved in a substantially waterfree polar organic solvent, c) separation of insoluble impurities from the obtained solution of MgCl$_2$ in the leaching solvent, d) precipitation of magnesium chloride hexammoniate by treating the solution with an excess amount of ammonia in a crystallizer without prior dehydration of the solution, e) separation of magnesium chloride hexammoniate crystals from the leaching solvent by filtration, centrifugation or other solid/liquid separation process, and finally f) thermal decomposition of the magnesium chloride hexammoniate crystals into magnesium chloride and ammonia.

It is preferred to use ethylene glycol or methanol as the polar organic solvent, but other solvents could also be used. In a preferred embodiment of the invention the leaching solvent necessary for the selective leaching step contains an amount of NH$_4$Cl stochiometrically equal to or in excess of the amount of Mg dissolved and the leaching solvent separated from the precipitated magnesium chloride hexammoniate could be recovered for reuse in the process. It is preferred to subject the recovered solvent to a water removal treatment prior to reuse. The leaching solvent necessary for the selective leaching step can be prepared by dissolving the amount of ammonium chloride needed in the substantially waterfree polar organic solvent or by dissolving the amount of ammonium chloride needed in the recovered solvent.

It is preferred to produce the ammonium chloride needed by reacting gaseous ammonia recovered from the thermal decomposition step with hydrogen chloride. The ammonium chloride could be produced in the presence of the substantially waterfree polar organic solvent or the recovered solvent. Further, it is preferred to produce the hydrogen chloride from the chlorine produced by electrolysis of the anhydrous magnesium chloride from the process. Any make-up Cl needed for the practical operation of the process could be introduced in the form of Cl$_2$, HCl, NH$_4$Cl or MgCl$_2$, either anhydrous or as hydrates. Any make-up NH$_3$ needed for the practical operation of the process could be introduced in the form of NH$_3$(g), NH$_3$(l) or NH$_4$Cl.

The process will be described in more detail and is readily understood from the following description referring to a preferred mode of operation of the process and the accompanying FIGS. 1–3, where FIG. 1 shows a flow chart of the process.

As mentioned above under the discussion of the prior art, processes for provision of substantially anhydrous MgCl$_2$ from Mg-containing minerals/ores are based on dissolving the raw material in hydrochloric acid. For instance, according to Australian patent 8933283, the dissolution of magnesite is performed in a series of agitated reaction vessels with gradually increasing pH resulting in precipitation of various heavy metal impurities (hydroxides). The resulting precipitate is separated from the aqueous solution of MgCl$_2$. However, soluble contaminants as e.g. Ca remain in solution, e.g. in the form of CaCl$_2$. According to WO95/11859, the partly purified brine is then mixed with ethylene glycol prior to dehydration in a series of distillation columns operating under successively increasing vacuum in order to remove all water, also crystal water. The dehydrated solution of MgCl$_2$ in ethylene glycol is then fed to a crystallizer together with NH$_3$. The resulting crystals of MgCl$_2$.6NH$_3$ are separated from the glycol solvent, washed with methanol saturated with NH$_3$ and transferred to a calciner where the resulting calcined solid is anhydrous MgCl$_2$. Besides the already mentioned drawback of starting with an aqueous MgCl$_2$ solution needing an energy demanding dehydration process, a special process step has to be included to remove the non-Mg salts e.g. $CaCl_2$ from the recirculated glycol solvent. These features have a negative impact on the investment as well as the operating costs for the process.

Figure 1:
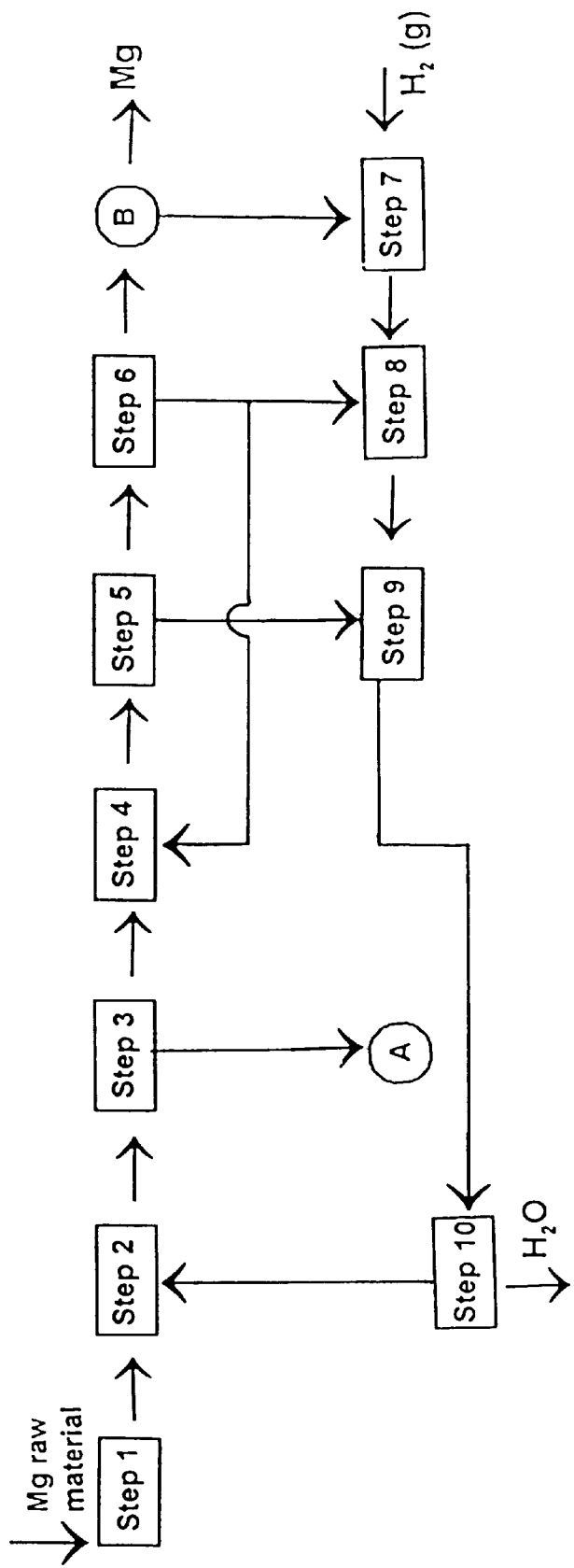
FIG. 1 is an illustration of a preferred embodiment of the new process according to the present invention, and shall not be interpreted in a limited manner in the light of the scope of the attached patent claims.

Referring to FIG. 1, the new process according to the present invention is schematically illustrated as a flow chart covering a preferred mode of running the process. The fundamental difference between the present process and prior art processes is the introduction of a weak acid in the form of an $NH_4Cl$ solution in a waterfree polar organic solvent used as a leaching medium on calcined Mg-containing minerals/ores, as e.g. dolomite ($CaCO_3.MgCO_3$), magnesite ($MgCO_3$) or brucite ($Mg(OH)_2$).

The calcination of Mg-minerals/ores (step 1) is a temperature controlled process in a temperature range between approx. 350 and 900° C., resulting in a controlled degree of calcination converting $MgCO_3$ and $Mg(OH)_2$ to MgO while leaving any $CaCO_3$ as a carbonate, providing an optimal starting material (comprising substantially $CaCO_3.MgO$ or MgO) for the next step in the process. The MgO is subsequently selectively dissolved in a solution of $NH_4Cl$ in a polar organic solvent, as e.g. ethylene glycol, methanol etc. (step 2).

Using ethylene glycol as the solvent as an example (here designated "Glycol"), the step 2 reaction may be described as follows:

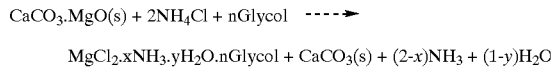

or, when using MgO as the starting material:

where x = <2 and y = <1.

Here $MgCl_2.xNH_3.yH_2O.nGlycol$ represents a symbolic notation indicating that up to 2 moles of $NH_3$ and up to 1 mole of $H_2O$ are coordinated to each mole of $MgCl_2$ while the balance of 6 positions of coordination to $MgCl_2$ is covered by ethylene glycol. Experiments show that some $NH_3$ is liberated in the reaction and escaping to the gas phase, indicating x<2, and that some $H_2O$ is liberated in the reaction and escaping to the gas phase, indicating y<1.

In a subsequent step (step 3) of the process, the undissolved matter containing impurities e.g. heavy metals as well as unwanted contaminants (e.g. $CaCO_3$) is separated from the glycol solution by filtration or other suitable means (A).

By the particular dissolving process described here some major/important objectives are achieved:
 a) Impurities, e.g. Ca, are not dissolved and can be easily separated from the solution, i.e. without a need for special purification steps, and
 b) only one mole of water per mole of $MgCl_2$ is produced in the reaction and this one mole represents the maximum amount of water present in the solution, eliminating the need for energy demanding removal of water prior to the next step of hexammoniate crystallization.

In step 4 of the process of this invention, and as applied to the example using ethylene glycol as the solvent, the $MgCl_2.xNH_3.yH_2O.nGlycol$ in ethylene glycol solution, which may also contain an amount of $NH_4Cl$ being in excess and therefore unreacted from step 2, is treated with an excess amount of ammonia in a crystallizer to achieve the crystallization/precipitation of the hexammoniate:

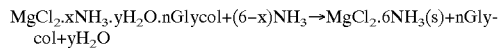

The resulting $MgCl_2.6NH_3$ crystals are separated from the organic solvent (step 5), e.g. by filtration, and the solvent is recovered for reuse in the leaching step 2 (see below). The crystals are washed (not shown in FIG. 1) with a low boiling point organic solvent saturated with $NH_3$ to remove remaining solvent from the earlier steps. The $MgCl_2.6NH_3$ complex is subsequently thermally decomposed into substantially anhydrous $MgCl_2$ and $NH_3$ (step 6).

The anhydrous $MgCl_2$ can be directly used as feed for Mg electrolysis (B), producing metallic magnesium (Mg) and gaseous chlorine ($Cl_2$) as products. The chlorine is advantageously processed e.g. with hydrogen to provide HCl in a synthesis reaction (step 7) for recycling within the overall process.

According to a preferred embodiment of the process, ammonium chloride ($NH_4Cl$), being consumed in the leaching step 2, is produced in an integrated process step by reacting HCl with part of the $NH_3$ originating from the thermal decomposition of $MgCl_2.6NH_3$ (step 6). The $NH_4Cl$ production may be performed by introducing the reactants HCl and $NH_3$ into the organic solvent or by dissolving the $NH_4Cl$ produced from these reactants in the solvent (step 9) prior to the use thereof for performing the leaching step 2 as described above.

Prior to the leaching step 2, either before, together with or after the addition of $NH_4Cl$ to the solvent, the solvent may be subjected to a water removal step 10 to remove any water remaining out of the water produced in the leaching step 2 as described above, or any water which may have been introduced with the make-up chemicals needed for the practical operation of the process.

The invention will be further illustrated by the following example.

EXAMPLE

Part 1

Figure 2:
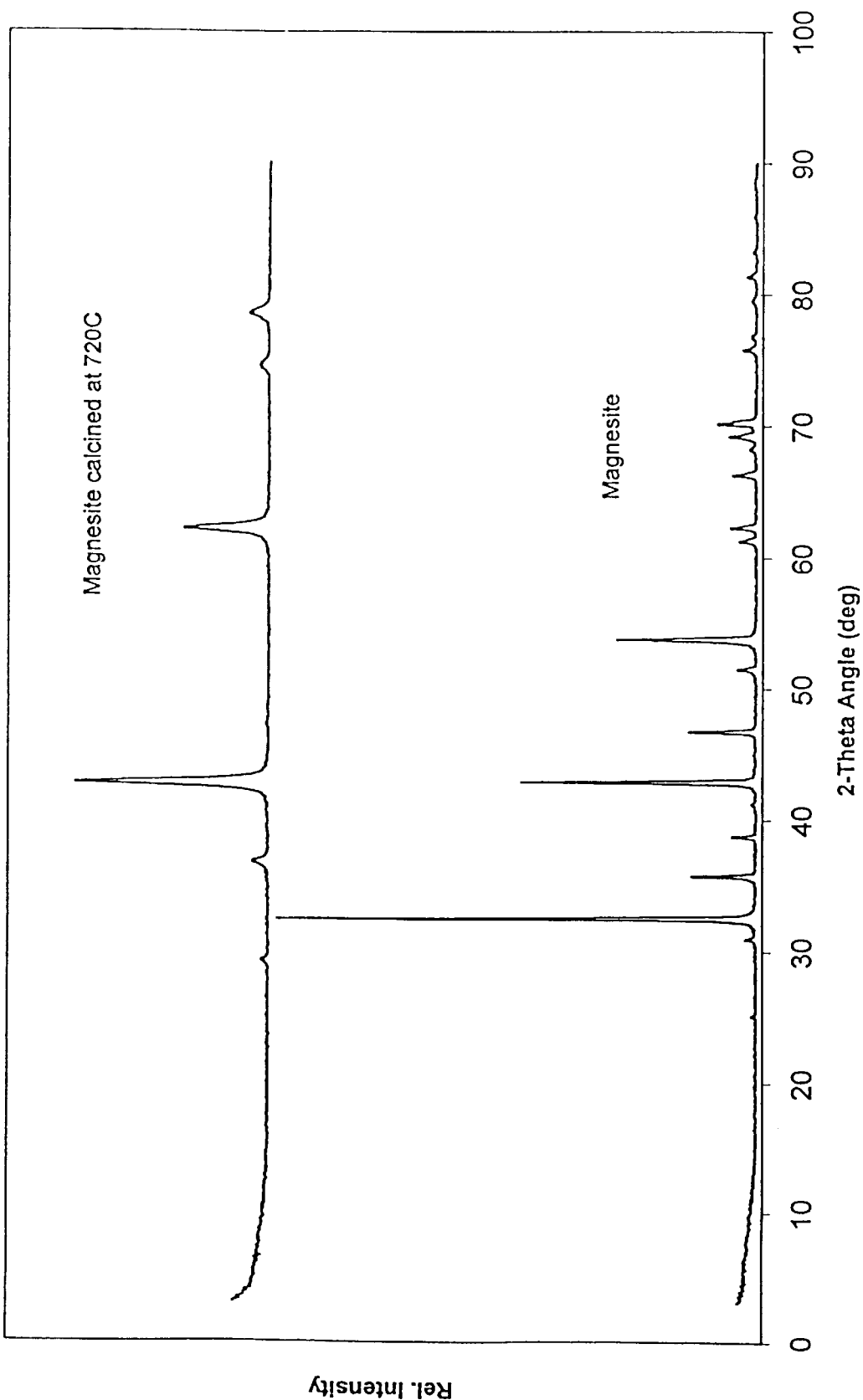
FIG. 2 shows the X-ray diffraction pattern of magnesite and magnesite calcined at 720° C.

In a quartz fluidized bed reactor 30 g of magnesite (mainly $MgCO_3$) with a content of 1.6% CaO was calcined at 720 deg C for 150 minutes in a gas flow of 30 ml/min with a gas composition of 50% $N_2$ and 50% $CO_2$. After calcination, the gas composition was changed to 90% $N_2$ and 10% $CO_2$ and the material rapidly cooled to room temperature. This calcination procedure ensured that $MgCO_3$ was transformed to MgO while most of the calcium was retained as $CaCO_3$ and not transformed to CaO (see FIG. 2, Table 1 and Table 2).

The chemical composition of the calcined magnesite was determined using ICP analysis. A Mg/Ca weight ratio of 23.8 was determined in the calcined material.

Ethylene glycol was dried by molecular sieve treatment. Into a 3-neck 250 ml round bottom flask fitted with a thermometer, a magnetic stirrer and a water cooled reflux condenser, 50 ml of waterfree ethylene glycol was added. 7 g of $NH_4Cl$ was added to the flask, and the temperature was brought up to 100 deg C and kept for 2 hours. Then the $NH_4Cl$ was completely dissolved. The resulting $NH_4Cl$/ethylene glycol solution was then heated to 120 deg C before adding 2.5 g of the calcined magnesite. The resulting slurry was kept at 120 deg C for 3 hours and then filtered using a Fluropore membrane filter (3 um). It was found that 0.095 g of the originally added 2.5 g magnesite was not dissolved. The Mg/Ca weight ratio of the filtrate and the undissolved material was determined by ICP analysis and found to be 1.13 and 63 respectively. The filtrate obtained containing the unreacted excess of $NH_4Cl$ (approx. 0.5 g) was kept for several days at room temperature without any precipitation occuring.

Part 2

Figure 3:
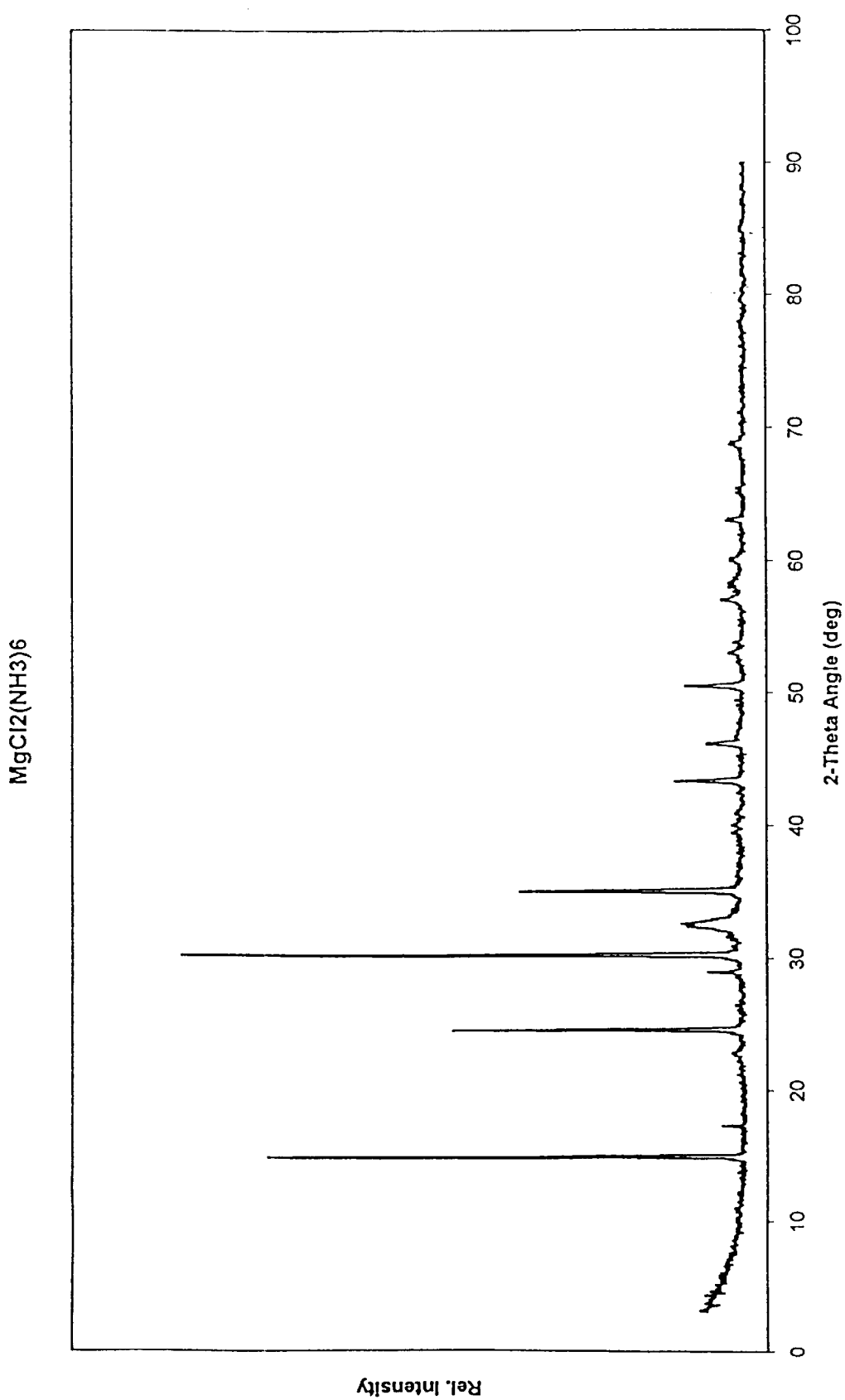
FIG. 3 shows the X-ray diffraction pattern of magnesium chloride hexammoniate (MgCl$_2$.6NH$_3$).

A separate 3 neck 250 ml round bottom flask was fitted with an ammonia gas sparging tube, a connection to the vent, a thermometer and a magnetic stirrer and placed in a cooled water bath, which was also stirred with a magnetic stirrer. To the flask 50 ml ethylene glycol was added which was saturated with anhydrous ammonia gas at 15 deg C. The $MgCl_2/NH_4Cl$/ethylene glycol solution (filtrate) obtained from Part 1 was added dropwise over a period of 30 minutes to the flask while maintaining the temperature at 15 deg C and continuously sparging ammonia gas. A precipitate formed almost immediately and continued to form during the addition of the solution and the ammonia. The precipitate was filtered under argon atmosphere and washed with 50 ml methanol which was saturated with ammonia at 15 deg C. The washed precipitate was vacuum-dried and stored in an argon atmosphere and analyzed using X-ray diffraction. The X-ray diffraction pattern obtained corresponded to the X-ray diffraction pattern of magnesium chloride hexammoniate ($MgCl_2.6NH_3$) (see FIG. 3, Table 3). No magnesium chloride glycolate compounds were observed. The X-ray diffraction patterns of magnesium chloride hexammoniate and various magnesium chloride glycolates are discussed in more detail in WO 95111859.

Part 3

A separate 5 neck 250 ml round bottom flask was fitted with ammonia gas and HCl gas sparging equipment, a thermometer, a connection to the vent and an overhead stirrer. The ethylene glycol solution which was obtained by the filtration as described under Part 2 above, was added to this flask at 15 deg C. Then 100 ml/min of ammonia gas and 100 ml/min of HCl gas were sparged into the solution and reacted under the formation of ammonium chloride ($NH_4Cl$). This exothermic reaction resulted in a significant temperature increase of the solution. An ethylene glycol/$NH_4Cl$ solution with 7 g of $NH_4Cl$ in 50 g of ethylene glycol was obtained, and no precipitation of ammonium chloride was observed. This solution can, according to the invention, be recycled to dissolve calcined magnesite.

TABLE 1

XRD spectrum of the magnesite used.

| 2 theta (deg) | d (Å) | Intensity |
|---|---|---|
| 25.1 | 3.55 | 1.4 |
| 30.4 | 2.88 | 2.7 |
| 32.5 | 2.75 | 100 |
| 38.75 | 2.32 | 5.9 |
| 41.2 | 2.19 | 1.5 |
| 42.9 | 2.1 | 50.7 |
| 46.7 | 1.94 | 14.1 |
| 51.5 | 1.77 | 4.7 |
| 53.7 | 1.7 | 26.1 |
| 61.2 | 1.51 | 4.4 |
| 62.3 | 1.49 | 5.6 |
| 66.2 | 1.41 | 5.4 |
| 68.2 | 1.37 | 1.5 |
| 69.2 | 1.36 | 6 |
| 70.1 | 1.34 | 7.5 |
| 75.8 | 1.25 | 3.6 |
| 76.8 | 1.24 | 1.6 |
| 79.5 | 1.2 | 0.9 |
| 81.3 | 1.18 | 2.7 |

TABLE 2

XRD spectrum of the calcined magnesite

| 2 theta (deg) | d (Å) | Intensity | Structure |
|---|---|---|---|
| 29.4 | 3.03 | 2.8 | calcite ($CaCO_3$) |
| 36.8 | 2.43 | 9.1 | magnesium oxide |
| 42.8 | 2.11 | 100 | magnesium oxide |
| 62.2 | 1.49 | 47 | magnesium oxide |
| 74.5 | 1.27 | 4.7 | magnesium oxide |
| 78.5 | 1.21 | 11.75 | magnesium oxide |

TABLE 3

XRD spectrum of the precipitated Magnesium Chloride Hexammoniate ($MgCl_2.6NH_3$)

| 2 theta (deg) | d (Å) | Intensity | Structure |
|---|---|---|---|
| 15 | 5.9 | 95 | $MgCl_2.6NH_3$ |
| 17.3 | 5.1 | 3 | " |
| 24.6 | 3.6 | 48 | " |
| 28.9 | 3.07 | 5.5 | " |
| 30.3 | 2.94 | 100 | " |
| 35.1 | 2.55 | 34 | " |
| 39.6 | 2.27 | 1.3 | " |
| 43.4 | 2.08 | 8.4 | " |
| 46.2 | 1.96 | 5.7 | " |
| 50.6 | 1.8 | 11.6 | " |
| 53 | 1.72 | 3.3 | " |
| 53.8 | 1.7 | 1.4 | " |
| 57 | 1.61 | 4.5 | " |
| 63.1 | 1.47 | 3.5 | " |
| 68.8 | 1.36 | 3 | " |

We claim:

1. A process for producing substantially anhydrous magnesium chloride suitable for electrolytic production of magnesium metal comprising steps of
   a) selective calcination of Mg-containing minerals/ores or other Mg-containing materials at temperatures within a range of 350–900° C.,
   b) selective leaching of magnesium from such calcined materials by using as a leaching solvent ammonium chloride dissolved in a substantially waterfree polar organic solvent,
   c) separation of insoluble impurities from the obtained solution of $MgCl_2$ in the leaching solvent,
   d) precipitation of magnesium chloride hexammoniate by treating the solution with an excess amount of ammonia in a crystallizer without prior dehydration of the solution,
   e) separation of magnesium chloride hexammoniate crystals from the leaching solvent by filtration, centrifugation or other solid/liquid separation process, and finally
   f) thermal decomposition of the magnesium chloride hexammoniate crystals into magnesium chloride and ammonia.

2. A process according to claim 1,
   where the polar organic solvent is ethylene glycol.

3. A process according to claim 1,
   where the polar organic solvent is methanol.

4. A process as claimed in claim 1, 2 or 3 wherein the leaching solvent necessary for the selective leaching step contains an amount of $NH_4Cl$ stochiometrically equal to or in excess of the amount of Mg dissolved.

5. A process according to claim 4 wherein the leaching solvent separated from the precipitated magnesium chloride hexammoniate is recovered for reuse in the process.

6. A process according to claim 5 wherein the recovered solvent is subjected to a water removal treatment prior to reuse.

7. A process according to claim 6 wherein the leaching solvent necessary for the selective leaching step is prepared by dissolving the amount of ammonium chloride needed in the recovered solvent.

8. A process as claimed in claim 7 wherein the ammonium chloride needed is produced by reacting gaseous ammonia recovered from the thermal decomposition step with hydrogen chloride.

9. A process according to claim 8 wherein the ammonium chloride is produced in the presence of the substantially waterfree polar organic solvent or the recovered solvent.

10. A process as claimed in claim 9 wherein the hydrogen chloride is produced from the chlorine produced by electrolysis of the anhydrous magnesium chloride from the process.

11. A process as claimed in claim 7 wherein any make-up Cl needed for the practical operation of the process is introduced in the form of $Cl_2$, HCl, $NH_4Cl$ or $MgCl_2$, either anhydrous or as hydrates.

12. A process as claimed in claim 7 wherein any make-up $NH_3$ needed for the practical operation of the process is introduced in the form of $NH_3(g)$, $NH_3(l)$ or $NH_4Cl$.

13. A process as claimed in claim 6 wherein any make-up Cl needed for the practical operation of the process is introduced in the form of $Cl_2HCl$, $NH_4Cl$ or $MgC_2$, either anhydrous or as hydrates.

14. process as claimed in claim 6 wherein any make-up $NH_3$ needed for the practical operation of the process is introduced in the form of $NH_3(g)$, $NH_3(l)$ or $NH_4Cl$.

15. A process as claimed in claim 5 wherein any make-up Cl needed for the practical operation of the process is introduced in the form of $Cl_2$, HCl, $NH_4Cl$ or $MgCl_2$, either anhydrous or as hydrates.

16. A process as claimed in claim 5 wherein any make-up $NH_3$ needed for the practical operation of the process is introduced in the form of $NH_3(g)$, $NH_3(l)$ or $NH_4Cl$.

17. A process according to claim 4 wherein the leaching solvent necessary for the selective leaching step is prepared by dissolving the amount of ammonium chloride needed in the substantially waterfree polar organic solvent.

18. A process as claimed in claim 17 wherein the ammonium chloride needed is produced by reacting gaseous ammonia recovered from the thermal decomposition step with hydrogen chloride.

19. A process according to claim 18 wherein the ammonium chloride is produced in the presence of the substantially waterfree polar organic solvent or the recovered solvent.

20. A process as claimed in claim 19 wherein any make-up $NH_3$ needed for the practical operation of the process is introduced in the form of $NH_3(g)$, $NH_3(l)$ or $NH_4Cl$.

21. A process as claimed in claim 19 wherein the hydrogen chloride is produced from the chlorine produced by electrolysis of the anhydrous magnesium chloride from the process.

22. A process as claimed in claim 19 wherein any make-up Cl needed for the practical operation of the process is introduced in the form of $Cl_2$, HCl, $NH_4Cl$ or $MgCl_2$, either anhydrous or as hydrates.

23. A process as claimed in claim 18 wherein the hydrogen chloride is produced from the chlorine produced by electrolysis of the anhydrous magnesium chloride from the process.

24. A process as claimed in claim 23 wherein any make-up Cl needed for the practical operation of the process is introduced in the form of $Cl_2$, HCl, $NH_4Cl$ or $MMgCl_2$, either anhydrous or as hydrates.

25. A process as claimed in claim 23 wherein any make-up $NH_3$ needed for the practical operation of the process is introduced in the form of $NH_3(g)$, $NH_3(l)$ or $NH_4Cl$.

26. A process as claimed in claim 18 wherein any make-up Cl needed for the practical operation of the process is introduced in the form of $Cl_2$, HCl, $NH_4Cl$ or $MgCl_2$, either anhydrous or as hydrates.

27. A process as claimed in claim 18 wherein any make-up $NH_3$ needed for the practical operation of the process is introduced in the form of $NH_3(g)$, $NH_3(l)$ or $NH_4Cl$.

28. A process as claimed in claim 17 wherein any make-up $NH_3$ needed for the practical operation of the process is introduced in the form of $NH_3(g)$, $NH_3(l)$ or $NH_4Cl$.

29. A process as claimed in claim 17 wherein any make-up Cl needed for the practical operation of the process is introduced in the form of $Cl_2$, HCl, $NH_4Cl$ or $MgCl_2$, either anhydrous or as hydrates.

30. A process as claimed in claim 4 wherein any make-up Cl needed for the practical operation of the process is introduced in the form of $Cl_2$, HCl, $NH_4Cl$ or $MgCl_2$, either anhydrous or as hydrates.

31. A process as claimed in claim 4 wherein any make-up $NH_3$ needed for the practical operation of the process is introduced in the form of $NH_3(g)$, $NH_3(l)$ or $NH_4Cl$.

32. A process as claimed in claim 1, 2 or 3 wherein any make-up Cl needed for the practical operation of the process is introduced in the form of $Cl_2$, HCl, $NH_4Cl$ or $MgCl_2$, either anhydrous or as hydrates.

33. A process as claimed in claim 1, 2 or 3 wherein any make-up $NH_3$ needed for the practical operation of the process is introduced in the form of $NH_3(g)$, $NH_3(l)$ or $NH_4Cl$.

* * * * *